United States Patent [19]

Yurchenco

[11] Patent Number: 4,689,761
[45] Date of Patent: Aug. 25, 1987

[54] MULTIPLE INDEPENDENT INPUT PERIPHERALS

[75] Inventor: James R. Yurchenco, Palo Alto, Calif.

[73] Assignee: Metaphor Computer Systems, Mountain View, Calif.

[21] Appl. No.: 641,162

[22] Filed: Aug. 14, 1984

[51] Int. Cl.⁴ .......................... G06F 1/00; G06C 7/02; G06C 9/00
[52] U.S. Cl. .................................. 364/708; 235/146; 364/900
[58] Field of Search ........ 364/708, 709, 900 MS File; 340/710, 711; 235/145 A, 145 R, 146

[56] References Cited

U.S. PATENT DOCUMENTS

| | | | |
|---|---|---|---|
| 3,524,970 | 8/1970 | An Wang | 364/709 |
| 4,124,843 | 11/1978 | Branson et al. | 340/711 |
| 4,148,014 | 4/1979 | Burson | 340/711 |
| 4,181,966 | 1/1980 | Wenninger et al. | 364/709 |
| 4,313,227 | 1/1982 | Eder | 340/711 |
| 4,455,618 | 6/1984 | Walden et al. | 364/709 |
| 4,488,146 | 12/1984 | Burchart | 340/711 |
| 4,506,336 | 3/1985 | Hird | 340/710 |
| 4,594,586 | 6/1986 | Hosogoe | 340/710 |

FOREIGN PATENT DOCUMENTS

| | | | |
|---|---|---|---|
| 2354042 | 5/1974 | Fed. Rep. of Germany | 364/708 |
| 57-5146 | 1/1982 | Japan | 364/709 |
| 58-84378 | 5/1983 | Japan | 364/709 |

OTHER PUBLICATIONS

Maruyama et al., "Keyboard/Mouse Adapter," *IBM Technical Disclosure Bulletin* vol. 27, #5 pp. 3042-3043, Oct. 1984.

Primary Examiner—Gary V. Harkcom
Assistant Examiner—Dale M. Shaw
Attorney, Agent, or Firm—Cushman, Darby & Cushman

[57] ABSTRACT

A computer system has a plurality of independent input peripheral devices which create a more user-friendly and versatile way to interact with the computer. An alphanumeric keyboard, a numeric keyboard, a function keyboard and a Mouse pointing device all communicate input data to the computer. The computer is simultaneously responsive to the data communicated by all of the input peripherals. The user may select one or more of the input peripherals to operate simultaneously to effect efficient data input. The input peripherals may be connected to the computer with cords, or may be operated in a cordless mode. The computer maps the data generated by the three keyboards into the same symbol table so that it need not determine where the data originated. Three of the input peripherals are disposable into cradles defined in a housing, while the alphanumeric keyboard is disposable into a cavity defined within the housing. An ejector mechanism discharges the alphanumeric keyboard from the cavity when a door of the cavity is opened.

4 Claims, 12 Drawing Figures

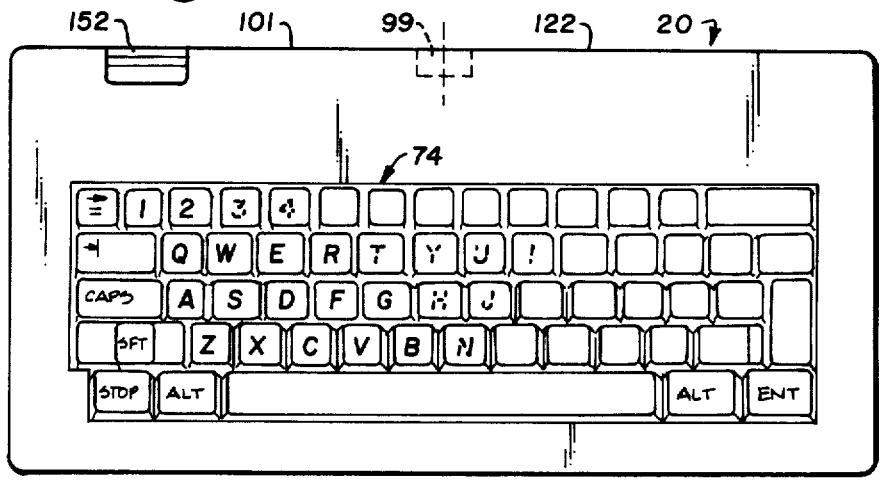
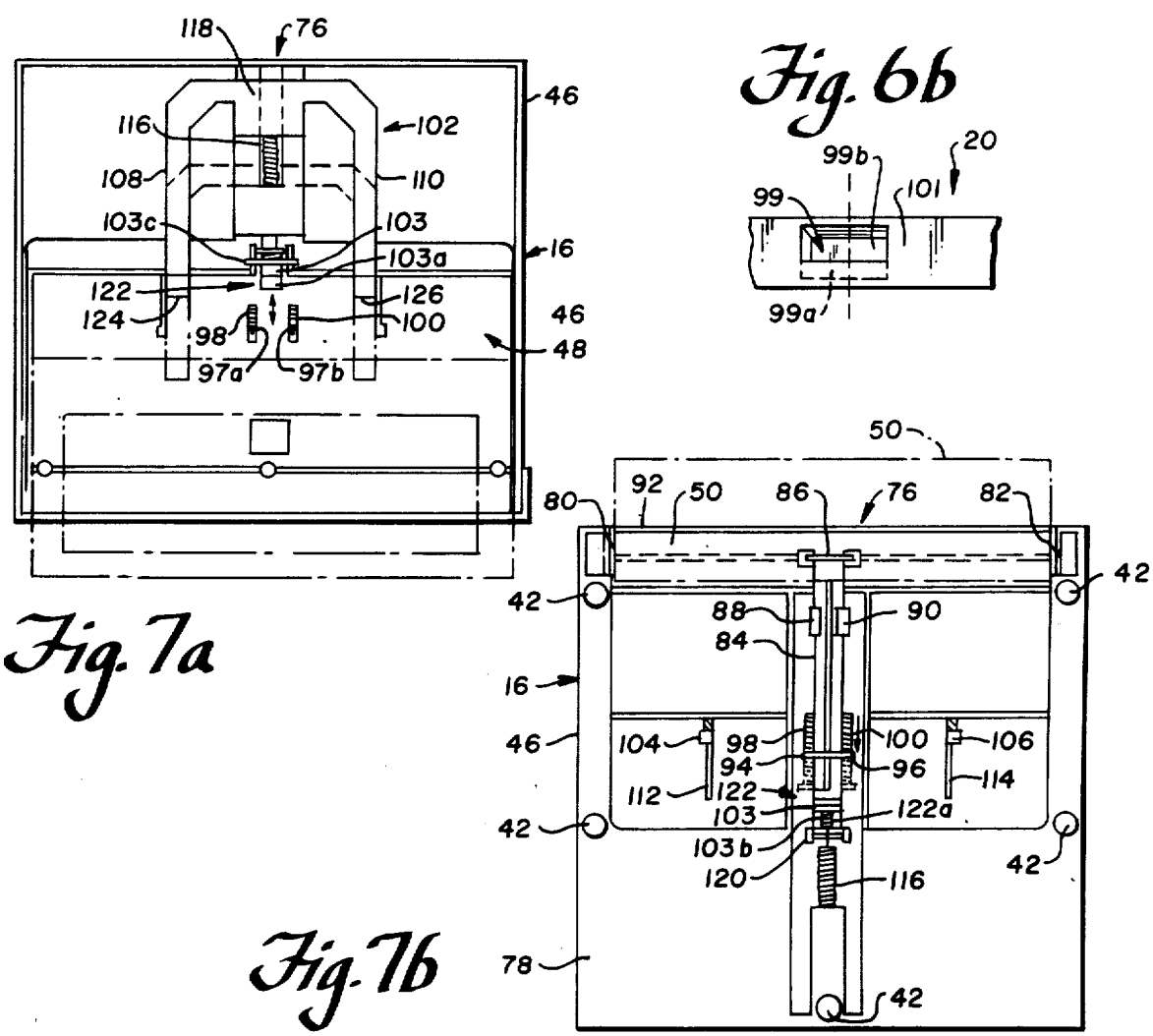

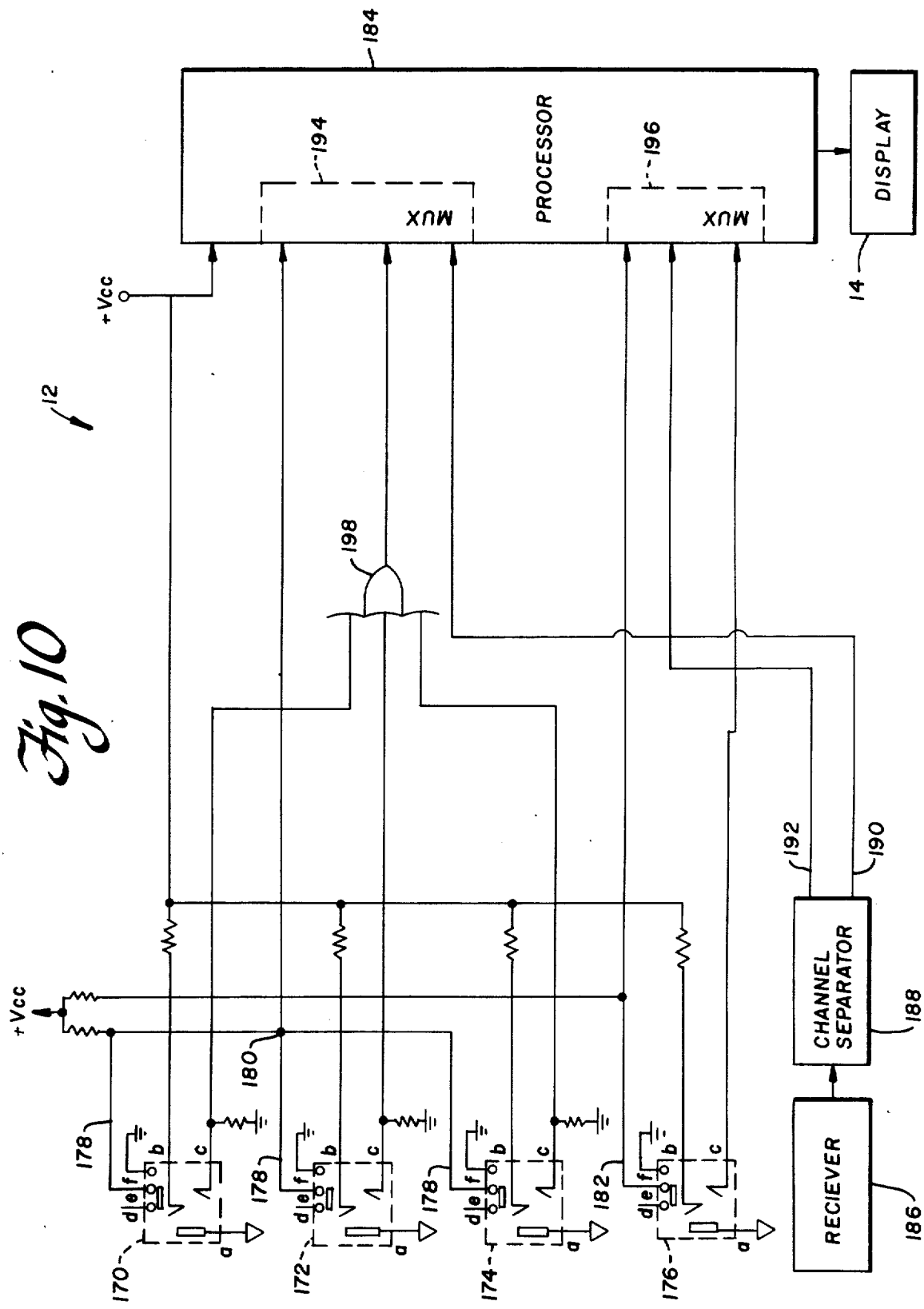

MULTIPLE INDEPENDENT INPUT PERIPHERALS

CROSS REFERENCES TO RELATED APPLICATIONS

This application is related to the following commonly-assigned copending applications: application Ser. No. 641,509 of Hong entitled "Simultaneous Communication for Multiple Remote Peripherals"; application Ser. No. 641,163 of Hong entitled "Peripheral Battery Condition Sensing and Recharging"; and application Ser. No. 641,131 of Hong entitled "Cordless Intelligent Mouse", all filed Aug. 14, 1984. These three commonly-assigned copending applications are hereby expressly incorporated herein by reference.

FIELD OF THE INVENTION

The present invention relates to a computer system having a plurality of input peripheral devices. More particularly, the present invention relates to computer systems which include a plurality of respective peripheral devices which are manipulable by user to facilitate data entry into the computer system.

BACKGROUND OF THE INVENTION

There was once a time when computers were used only by scientists and mathmaticians. Computers today are so pervasive in modern society that they somehow touch the lives of nearly every inhabitant of an industrialized nation on a daily basis. Record-keeping, word processing, data base access and manipulation, communications, personal scheduling, financial bookkeeping and automatic control functions are a few of the plethora of applications for which computers are being used. The use of computers will become even more widespread as computer hardware and software increases in sophistication, power and efficiency and decreases in cost.

Despite the pervasiveness of computers in the modern world, many people are apprehensive about using computers. Most sophisticated computer systems require a user to have technical knowledge if he is to effectively interact with the computer system. User commands to the computer system typically must be typed into an alphanumeric keyboard which provides the principal means of communication between the user and the computer system. User commands must be correctly formatted, and the user often must have a knowledge of the function performed by the computer, rather than simply desire a result to be achieved, in order to truly effectively interact with the computer system. For instance, to edit a document using a typical computer system, a user must type a plurality of commands into an alphanumeric keyboard. Individual commands load the document to be edited from a permanent storage device into a random access memory, call up the editor routine, store the edited version of the document on the permanent storage device, etc. The command strings often are mnemonics for the actual functions which the computer system must perform on the information to be processed.

Unfortunately, an unsophisticated or nontechnical user may have a desired result in mind but have no idea what steps the computer system must perform to accomplish the result.

It takes many long hours of experimentation and instruction to learn how to effectively interact with modern sophisticated computer systems. Many people (such as, for example, business executives, accountants, physicians, attorneys, secretaries, etc.) who would greatly benefit from the vast information handling capabilities which computer systems provide have neither the time nor the inclination to learn high-level computer programming languages or even sophisticated user environment command protocol. Besides, many such users are intimidated by the extremely technical computer "jargon" one uses to communicate with a computer.

One of the principal limitations on the "user friendliness" of a computer system is the nature of the physical device through which the user communicates with the computer. Most systems provide an alphanumeric keyboard as the principal input peripheral device. The user may depress one or a series of keys on the keyboard to communicate character or numeric symbols to the computer. Unless the user is familiar with the layout of alphanumeric keyboards and is a reasonably good typist, data entry can be inconvenient and time consuming. Moreover, alphanumeric keyboards are physically large and may provide more input capability than is typically needed by many users. For instance, an accountant might rarely need to input character information into his or her computer, but typically input mostly numeric information. Software has been developed and introduced which places the user in a relatively "user-friendly" environment by establishing simple command protocols by which the user communicates with the computer system to accomplish a desired result. The amount and complexity of data entry needed to interact with this sort of "user-friendly" environment is considerably reduced. Software now exists which permits a user to command a computer to perform a large number of extremely complex functions by inputting only a few keystrokes. This trend will no doubt continue as more application-specific software is developed.

The mouse pointing device has recently become a popular add-on to computer systems to facilitate data entry. A mouse pointing device generates signals corresponding to the direction and distance (i.e., displacement) which it is physically moved across a flat surface by a user. These signals are normally used to control the position of a cursor on the computer display. Mouse pointing devices provide a much easier way to change cursor position than was previously provided by the tab key and cursor control keys (up-arrow, left-arrow, down-arrow and right-arrow) ( ↑, ←, ↓, →) of an alphanumeric keyboard. Mouse pointing devices are presently available from a number of different manufacturers, such as Logitech, Co., Mouse Systems Co., and MicroSoft.

Of course, many computer terminals include a numeric switch array on one side of the alphanumeric keyboard (in addition to the numerical keys which comprise the top row of such a typical alphanumeric keyboard) to facilitate numeric data entry. Some terminals also include a special function keypad which is designed to provide data entry to interact with specialized or user-defined software functions. For instance, the CMS interactive user environment developed by IBM for its main-frame computer systems is designed to communicate with an alphanumeric keyboard which includes twelve function keys (labeled PF1-PF12). The CMS environment includes facilities permitting a user to specify one or more CMS commands, which are to be sent to the computer system upon the depression of a particular one of the function keys. Some of the software designed to run under the supervision of CMS also dedicates the function keys to different software utility functions to facilitate user interaction.

Prior art alphanumeric keyboards which include both a function key matrix and a numerical key matrix are typically of single-unit construction, requiring that a user ensconce himself or herself behind a relatively large, imposing (and often intimidating) console to interact with the computer system. This physical environment is not particularly conducive to free and easy interaction between the computer and a non-technical person, and often instills terror in those non-technical people who have had bad experiences with automatic bank teller machines and the like and those who are "button-shy". Moreover, a full-sized control console is not particularly attractive and would detract from the decor of the well-furnished office of a business executive. Finally, full-sized alphanumeric keyboard consoles are so physically large that they must often be fixedly positioned, requiring that the user position himself or herself behind such consoles even though the user might be more confortable elsewhere.

SUMMARY OF THE INVENTION

The present invention is a computer system which utilizes a plurality of independent input peripheral devices to create a more user-friendly and versatile way to interact with the computer. A first keypad manipulable by a user selectively produces a first input signal. A second keypad manipulable by the user selectively produces a second input signal. A data processor responsive simultaneously to the first and second input signals processes the input signals.

The data processor processor preferably includes a housing in which is defined a plurality of indentations and a cavity. The first keypad is selectively disposable into the cavity and may be stored therein. Each of the second and a third keypads and an electronic mouse is selectively disposable into one of the plurality of indentations defined in the housing to be stored therein.

The housing preferably further includes a mechanism which selectively ejects the first keypad from the cavity. The housing preferably includes a door which seals the cavity when the first keypad is disposed in the cavity to permit the first keypad to be hidden away when not in use. The door is coupled to the ejection mechanism so that the first keypad is ejected from the cavity when the door is opened.

The first keypad preferably comprises an alphanumeric keyboard including a plurality of alphanumeric keys selectively depressable by the user. The second keypad preferably is a numerical keypad which includes a plurality of numeric keys selectively depressable by the user. A third keypad preferably comprises a function keypad which includes a plurality of function keys selectively depressable by the user.

The first, second and third keypads and the electronic mouse preferably transmit their respective input signals through free space. The data processor includes a receiver which receives the transmitted input signals and processes them. A cord is preferably selectively connectable between the data processor and at least one of the first, second and third keypads and the electronic mouse, and provides an alternate signal path over which signals can be communicated from the input peripheral to the processor. The cord may also provide power to the peripheral device to which it is connected.

In accordance with the present invention, a very user-friendly interactive environment is provided which facilitates interaction between the user and the computer. A user such as an accountant often only needs to use the numerical keypad to interact with software providing numerical analysis and bookkeeping. The function keypad can be used when interacting with relatively sophisticated application-specific software requiring little data entry and instead presenting, for instance, a menu of possible functions from which the user can select desired functions to be performed. The electronic mouse can control cursor position and is also provided with depressable buttons for interacting with software causing "icons" or other function legends to be displayed. A full alphanumeric keyboard is provided for use when entering text or when interacting with software which requires a large amount of data entry.

The user may select which one or ones of the input peripherals best suits his or her needs at a given time, and may leave the ones of the input peripherals which he or she is not presently using safely stored away in the housing. Work space remains uncluttered with input devices not presently being used. The user may use both hands simultaneously to input information (such as, for example, using one hand to move the Mouse pointing device to position the display cursor while using the other hand to depress keys on one of the keyboards) in order to more effectively and quickly interact with the computer system. The present invention provides a great amount of flexibility which permits the user to choose how he or she will interact with the computer system. The added flexibility and versatility provided by the present invention not only permits more experienced users to more effectively interact with the computer system, but also provides a less intimidating physical environment than previously available which enables even non-technically trained users to operate the computer system without undue apprehension.

BRIEF DESCRIPTION OF THE DRAWINGS

With reference to the appended six sheets of drawings,

FIG. 6 (a) is a top view in plan of the alphanumeric keyboard shown in FIG. 1;

FIG. 6 (b) is a detailed elevated side view in perspective of the alphanumeric keyboard shown in FIG. 6(a) detailing the cavity defined on the side wall of the keyboard;

FIG. 7 (a) is a top view in plan of the alphanumeric keypad ejector system disposed within the housing shown in FIG. 2;

FIG. 7 (b) is a bottom view in plan of the housing shown in FIG. 2 which shows the portion of the ejector system which is disposed beneath the housing;

FIG. 10 is a block diagram of the interface between the computer and the input peripherals in accordance with the present invention.

DETAILED DESCRIPTION OF THE PREFERRED EMBODIMENT

Figure 1:
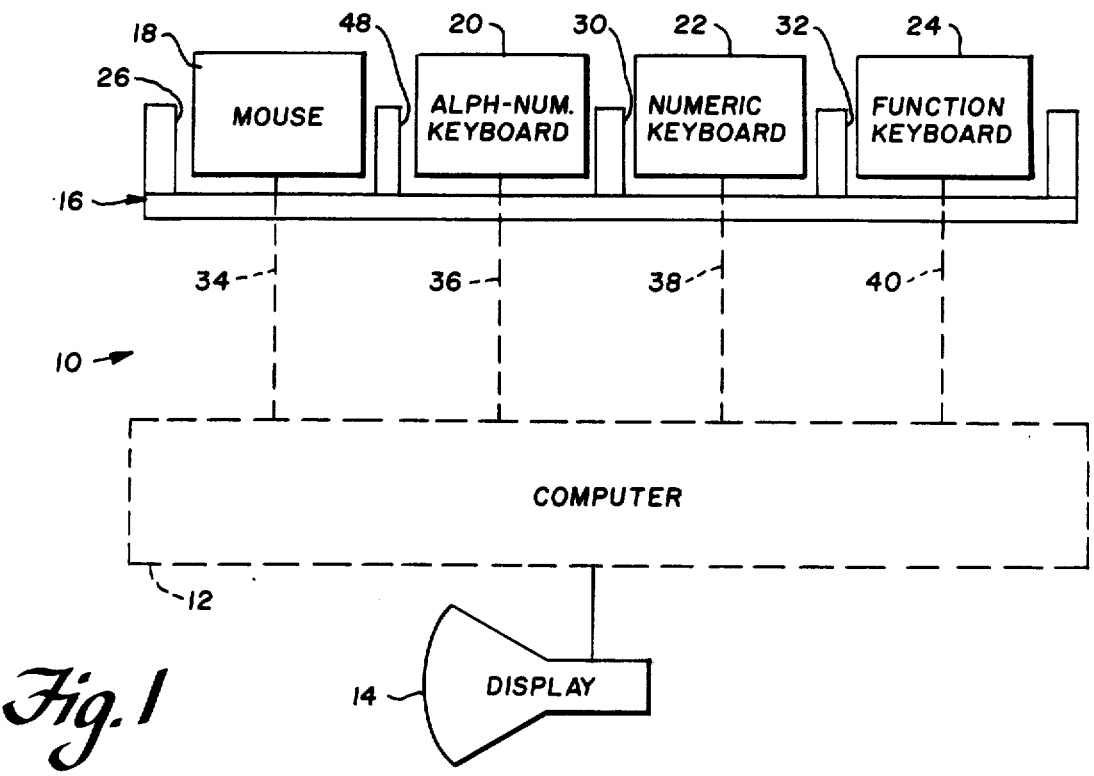
FIG. 1 is a block diagram of the presently preferred exemplary embodiment of a computer system 10 in accordance with the present invention.

A block diagram of the presently preferred exemplary embodiment of a system 10 in accordance with the present invention is depicted in FIG. 1. System 10 includes a computer 12, a display 14, and a housing 16. System 10 also includes a plurality of input peripheral devices. In the preferred embodiment, system 10 includes a mouse pointing device 18, an alphanumeric keyboard 20, a numeric keyboard 22 and a function keyboard 24. A depression or "cradle" 26 is defined in housing 16 which is adapted to physically receive mouse pointing device 18. Likewise, cradles 30 and 32 defined in housing 16 are adapted to receive numeric keyboard 22 and function keyboard 24, respectively. A cavity 48 is defined within housing 16 which receives alphanumeric keyboard 20. Cradles 26, 30, and 32 and cavity 48 provide storage positions for the various peripheral devices and may also act as recharging bases to recharge the peripherals (if they are battery operated). Mouse pointing device 18, alphanumeric keyboard 20, numeric keyboard 22 and function keyboard 24 communicate information to computer 12 via independent data paths 34, 36, 38 and 40, respectively, as will be explained shortly (the peripheral devices cannot necessarily establish such communication when they are disposed in their respective cradles, into which they are intended to be disposed during periods of non-use).

Figure 2:
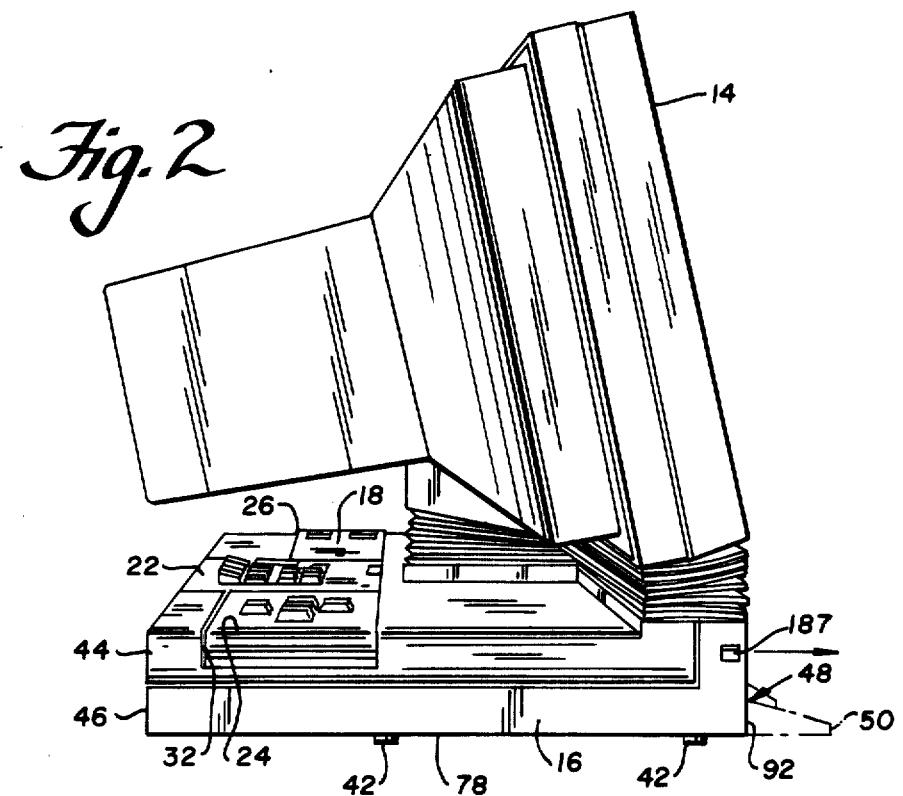
FIG. 2 is an elevated side perspective view of the system shown in FIG. 1.

FIG. 2 shows the physical layout of system 10 in accordance with the present invention. Housing 16 is preferably a square-shaped box-like structure supportable on a flat surface by a plurality of legs or pads 42. Housing 16 preferably comprises a top half 44 and a bottom half 46 each of which are constructed of molded impact-resistant plastic. Cradles 26, 30 and 32 are molded into top half 44 of housing 16 and have dimensions selected such that each of the cradles receives one of mouse pointing device 18, numerical keyboard 22 and function keyboard 24. Alphanumeric keyboard 20 is disposable in cavity 48 defined within hollow housing 16. A hinged door 50 selectively seals cavity 48 while alphanumeric keyboard 20 is disposed within the cavity, thereby hiding the alphanumeric keyboard from view, protecting the alphanumeric keyboard from physical damage and conserving desk top space. As will be explained shortly, when door 50 is opened, alphanumeric keyboard 20 is automatically ejected from cavity 48 so that a user can easily obtain and use the keyboard.

Figure 3:
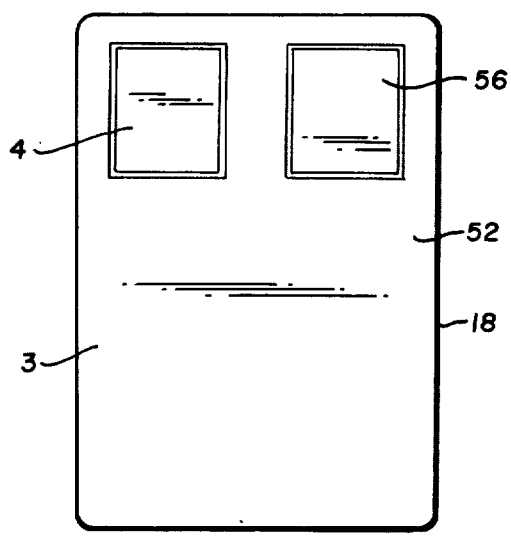
FIG. 3 is a top view in plan of the mouse pointing device shown in FIG. 1.

FIG. 3 is a top view of mouse pointing device 18. Mouse pointing device 18 comprises a outer box-like housing 52 (preferably of two-piece molded impact-resistant plastic construction) upon a top surface 53 of which are disposed two depressable buttons 54 and 56. Mouse pointing device 52 also includes a conventional movement sensing device (not shown) which senses the movement of housing 52 across a flat surface such as a desk top. Mouse pointing device 18 communicates signals produced by one or both of movement of housing 52 across a surface and the depression of buttons 54 and 56 to computer 12 via data path 34. Signals corresponding to the movement of housing 52 across a surface are preferably used by computer 12 to control the position of a display cursor displayed on display 14 in a conventional manner. The depression of buttons 54 and/or 56 may cause computer 12 to perform one or more predetermined functions selected by software executing on computer 12 depending upon a variety of different variables (such as cursor position, content of the display presently being displayed by display 14, history of steps previously performed, etc.).

Figure 4:
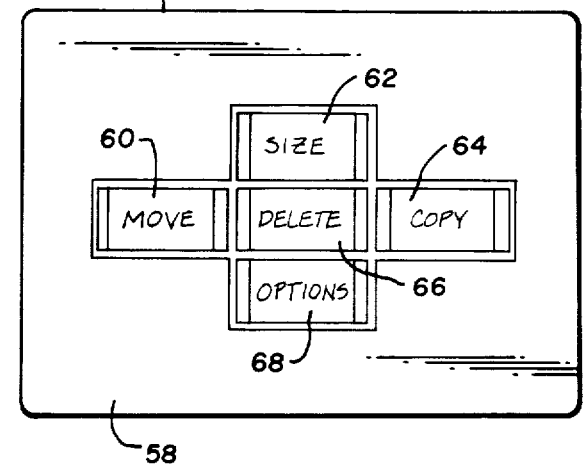
FIG. 4 is a top view in plan of the function keypad shown in FIG. 1.

A top view of function keyboard 24 is shown in FIG. 4. Function keyboard 24 includes a box-like housing 58 upon which are disposed five depressable buttons 60, 62, 64, 66 and 68. Although five buttons are disposed on function keypad 24 in the preferred embodiment, it will, of course, be understood that a greater or fewer number of buttons might be desirable depending upon the software with which the function keyboard is to interact. In the preferred embodiment, button 60 (imprinted with the indicium "MOVE") is used primarily for marking and moving text. Button 62 in the preferred embodiment bears the indicium "SIZE" and is used to change the size of menu windows displayed on display 14. Button 64 in the preferred embodiment is labelled "COPY" and is used to copy information from one location on display 14 to another. Button 66 in the preferred embodiment is labeled "DELETE" and is used in the preferred embodiment to delete information from a file. The DELETE button 66 is positioned at the center of the 5-button array to make it somewhat more difficult to depress than the other four buttons, thereby helping to prevent accidental deletion of information. Button 68 in the preferred embodiment is labled "OPTION" and has a variety of uses depending upon the display format presently being displayed by display 14, the position of the cursor on the display, the history of past steps performed, etc.

It will be readily understood that the functional assignment for the various buttons of function keypad 24 is somewhat arbitrary and will depend on the particular software presently being executed by computer 12. Generally, it is desirable to dedicate buttons of function keypad 24 to particular, commonly-used functions such that a user may interact with the computer system principally through the function keypad (at least for some applications) while having to rarely resort to use of another one of the system keypads. The function to which a particular one of buttons 60–68 is dedicated may, of course, be changed or customized by the software being executed, and the software may permit a user to specify what functions are to be performed when one or more of the buttons of function keypad 24 are depressed. Software executable by computer 12 responsive to the depression of the small number of keys provided by function keyboard 24 is conventional in design and is readily available from a number of computer software sources.

Figure 5:
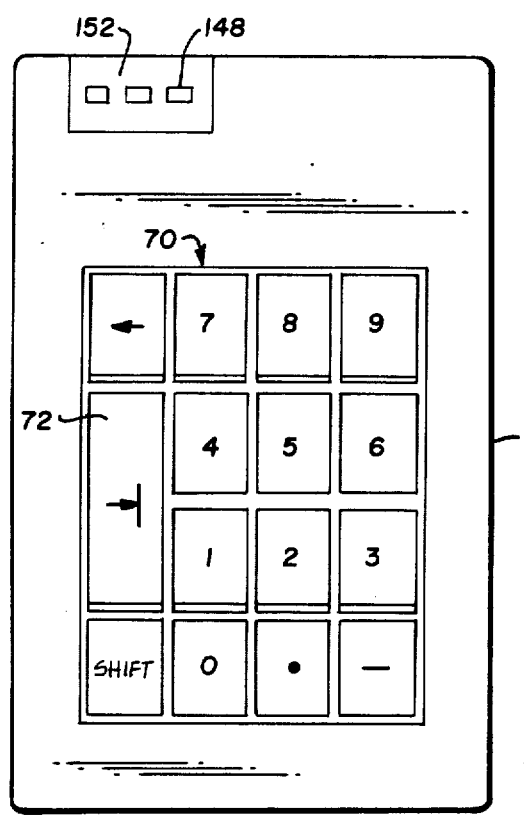
FIG. 5 is a top view in plan of the numeric keypad shown in FIG. 1.

A top view of the numeric keyboard 22 is shown in FIG. 5. In the preferred embodiment, numeric keyboard 22 comprises a 15-key button matrix 70. Button matrix 70 includes a button for each digit 0–9, as well as a button for symbols often used in arithmetic operations (such as "paragraph" (i.e., next data field entry), ", ", "-" and "backspace"). Button matrix 70 also includes a shift key 72 which provides an auxiliary function for each of the numeric buttons of the button matrix. Shift key 72 may be used to permit numeric keyboard 22 to be used as an expanded function keyboard. For instance, if IBM CMS software is to be run on system 10, numeric keyboard 22 can be used as a PF key matrix (which provides special function capabilities). If numeric keyboard 22 were used as the PF function keyboard, the depression of one of the keys of button matrix 70 would cause numerical or symbol information to be transmitted to computer 12 if depressed alone, and would cause information corresponding to the special functions to be transmitted to the computer if shift key 72 were depressed first. In the preferred embodiment, depressing the SHIFT key followed by the "−" key initiates an addition ("+") (at least for some applications).

A top view of alphanumeric keyboard 20 is shown in FIG. 6(a). Alphanumeric keyboard 20 includes a conventional key matrix 74 having 59 keys in the preferred embodiment. Each of the letters of the alphabet is imprinted on its own key of matrix 74. Likewise, a different key of matrix 74 is dedicated to each of the digits 0–9. Also included in matrix 74 is a space bar, a shift key, an alternate shift key, an upper/lower case key, etc. (as is provided on most conventional alphanumeric keyboards). Alphanumeric keyboard 20 is operated by the user to interact with computer 12 when a large amount of information must be input to the system or when interacting with software which was not designed to be particularly user-friendly.

Of course, there can be overlaps in the information provided by the various keypads 20, 22 and 24. Numeric information can be entered into system 10 either through numeric keyboard 22 or through alphanumeric keyboard 20. Likewise, depending upon the software executing on system 10, depressing the "MOVE" button 60 of function keyboard 24 and typing in the symbols "MOVE" via alphanumeric keyboard 20 may cause computer 12 to perform the same task. Typically it is desirable to permit any information capable of being entered via mouse pointing device 18, numeric keyboard 22 or function keyboard 24 to be entered via alphanumeric keyboard 20 so that a user may use only alphanumeric keyboard 20 for all data entry if he or she wishes. However, beyond the broad functional breakdown described above of utilizing mouse pointing device 18 to enter positional information, utilizing numeric keyboard 22 to enter numeric or extended function information, utilizing function keyboard 24 to enter function information and utilizing alphanumeric keyboard 20 to enter general information, the specific correspondence between the depression of a particular key on any one of the keyboards (or the depression of a button on mouse pointing device 18 or moving the mouse pointing device across a surface) and the particular task or operation which computer 12 performs in response to that act may depend upon a variety of different factors (which may be changed at any time by software), and the present invention in no way is limited to any one such correspondence. (One example of this is the use of the numeric keyboard 22 as an extended function keypad for interacting with a graphics software application program.) Likewise, mouse pointing device 18 can be used as a substitute alphanumeric keyboard by causing an image of a keyboard to be displayed on display 14 and using the mouse to point to particular "keys" on the display.

Alphanumeric keyboard 20, as was previously mentioned, is disposable in a cavity 48 defined within housing 16. FIGS. 7(a) and 7(b) show top and bottom views, respectively, of the ejector system 76 in accordance with the presently preferred exemplary embodiment of the present invention. FIG. 7(a) shows the portion of ejector system 76 disposed within cavity 48, while FIG. 7(b) shows the portion of the ejector system disposed beneath housing 16 on a bottom surface 78 thereof. A door 50 is journaled to housing 16 by pins 80 and 82 (which extend from either end of the door and are each disposed in a hole (not shown) defined in the housing). Door 50 is pivotable on the pins between an open position (shown in phantom) and a closed position. Door 50 is journaled to an actuator arm 84 by a pin 86. Actuator arm 84 is capable of only rectilinear movement because it is held in place by track guides 88 and 90 (which extend from bottom surface 78). When door 50 is closed, actuator arm 84 slides rectilinearly toward the front 92 of housing 16. When door 50 is opened, actuator arm 84 slides rectilinearly in a direction away from the front 92 of the housing.

Two projections 94 and 96 project from actuator arm 84. Projections 94 and 96 each serve to connect acutator arm 84 with one of springs 98 and 100. Springs 98 and 100 are anchored to pins 97a and 97b, respectively and bias actuator arm 84 toward the front 92 of housing 16, thereby helping to retain door 50 in a closed position once the door is closed.

A cavity 99 (better shown in FIG. 6(b)) is defined in the approximate center of a front surface 101 of alphanumeric keyboard 20. Cavity 99 is a rectangular-shaped cavity which has an overhanging lip 99a near its entrance so that the area of the opening on front surface 101 of the cavity is smaller than the area of a bottom surface 99b of the cavity.

A catching arm 122 is pivotally journaled to housing 16 and is disposed in a hole 122a connecting cavity 48 to bottom surface 78 (the catching arm can be journaled to the housing by pins disposed in holes). Catching arm 122 is L-shaped, i.e., it has a projection 103 projecting at approximately right angles to the remainder of the arm. Projection 103 terminates in a bevelled portion 103a. Projection 103 is disposable into cavity 99 of alphanumeric keyboard 20 when the keyboard is pushed into the cavity to contact the catching arm 122.

A spring 103b biases projection 103 of catching arm 122 to an upward position (i.e., in a position toward an ejector arm 102) while a stop 103c prevents the catching arm from pivoting further toward the rear of housing 16. When alphanumeric keyboard 20 is disposed into cavity 48 and is pushed back to contact catching arm 122, the bevelled portion 103a of the catching arm contacts lip 99a. As force is exerted on keyboard 20 by the user, bevelled portion 103a slides further into cavity 99 (causing catching arm 122 to pivot against the bias of spring 103b). When all of bevelled portion 103a is disposed in cavity 99 and the bevelled portion clears lip 99a, spring 103b forces catching arm 122 to pivot back to its original position, thereby causing projection 103 to engage with the lip. Bevelled portion 103a is now fully within cavity 99 and is pushed by spring 103b into the portion of the cavity 99 hidden from view in FIG. 6(b) by lip 99a. Alphanumeric keyboard 20 is firmly grasped by catching arm 122.

An ejector arm 102 is disposed within cavity 48. Ejector arm 102 is a U-shaped member which is movable between a first position at the rear of cavity 48 (i.e. away from front 92) and a second position (shown in phantom) wherein it projects further toward the door 50. Ejector arm 102 is constrained to move only rectilinearly by projections 104 and 106. Projections 104 and 106 extend from different ones of arms 108 and 110 of the ejector arm 102 into slots 112 and 114, respectively, defined in bottom half 46 of housing 16. The length of slots 112 and 114 servey to limit the amount of travel between the two positions of the ejector arm 102.

Ejector arm 102 is biased toward the position nearest to door 50 by a relatively stiff spring 116. Spring 116 is connected at one end to ejector arm 102 at a point approximately at the center 118 of the U, and is connected at its other end to a pin 120 projecting from the underside surface 78 of housing 16. Spring 116 is relaxed when ejector arm 102 is at a position closest to front 92 of housing 16, and is extended when ejector arm 102 is at a position away from the front position.

When alphanumeric keyboard 20 is inserted into cavity 48 of housing 16, surface 101 of the keyboard contacts end portions 124 and 126 of ejector arm 102. Electrical contacts (not shown) may be disposed on end portions 124 and 126 of ejector arm 102, and electrical contacts (not shown) may be disposed on surface 101 of keyboard 20. When keyboard 20 is inserted into cavity 48, the electrical contacts on surface 101 may contact the electrical contacts on end portions 124 and 126 to connect power and other electrical signals between the keyboard and the housing 16. As alphanumeric keyboard 20 is further inserted into cavity 48, ejector arm 102 is pressed back against the bias of spring 116 until it reaches its rear-most position. When ejector arm 102 is in its rear-most position, alphanumeric keyboard 20 is completely disposed within cavity 48. Bevelled portion 103a of actuator arm 84 protrudes into cavity 99 (as discussed previously) and latches lip 99a of the keyboard, thereby retaining the keyboard in position. The keyboard in turn retains ejector arm 102 in its rearward position.

When door 50 is shut, actuator arm 84 moves rectilinearly to affect the operation of catching arm 122, making the position of the catching arm dependent upon the position of door 50 (i.e., dependent upon the position of actuator arm 84). This is accomplished by a bevelled projection 84a which projects from the underside of actuator arm 84 and slides over the end of catching arm 122 projecting through hole 122a to bottom surface 78. When actuator arm 84 moves toward the front of housing 16 (by closing door 50), the bevelled projection 84a of the actuator arm slides over the top of a hole 122a of catching arm 122 (the actuator arm is somewhat flexible but is essentially rigid and biases the projection into close contact with the catching arm). As actuator arm 84 continues to slide rectilinearly frontward, the bevelled projection 84a will clear the end of catching arm 122 and the rigidity of the actuator arm will snap the bevelled portion securely into a position to the front of the catching arm.

When door 50 is opened, actuator arm 84 slides rearward. The bevelled projection 84a of the actuator arm contacts the catching arm 122 and causes it to pivot against the bias of spring 103b. When catching arm 122 has pivoted enough, bevelled portion 103a clears lip 99a, thereby releasing alphanumeric keyboard 20. Spring 116 pulls ejector arm 102 toward the front of housing 16 by exerting a substantial amount of force onto it, which in turn pushes alphanumeric keyboard 20 out of cavity 48. The force exerted by spring 116 is selected so that the alphanumeric keyboard 20 is expelled only a short distance out of the cavity to prevent it from dropping onto the floor or incurring physical damage as it is expelled.

As catching arm 122 pivots and actuator arm 84 continues to move rearward, the bevelled projection 84a extending from the actuator arm clears the catching arm. Catching arm 112 returns to its original position under the force of spring 103b and is ready to once again engage with lip 99a of alphanumeric keyboard 20.

Figure 8:
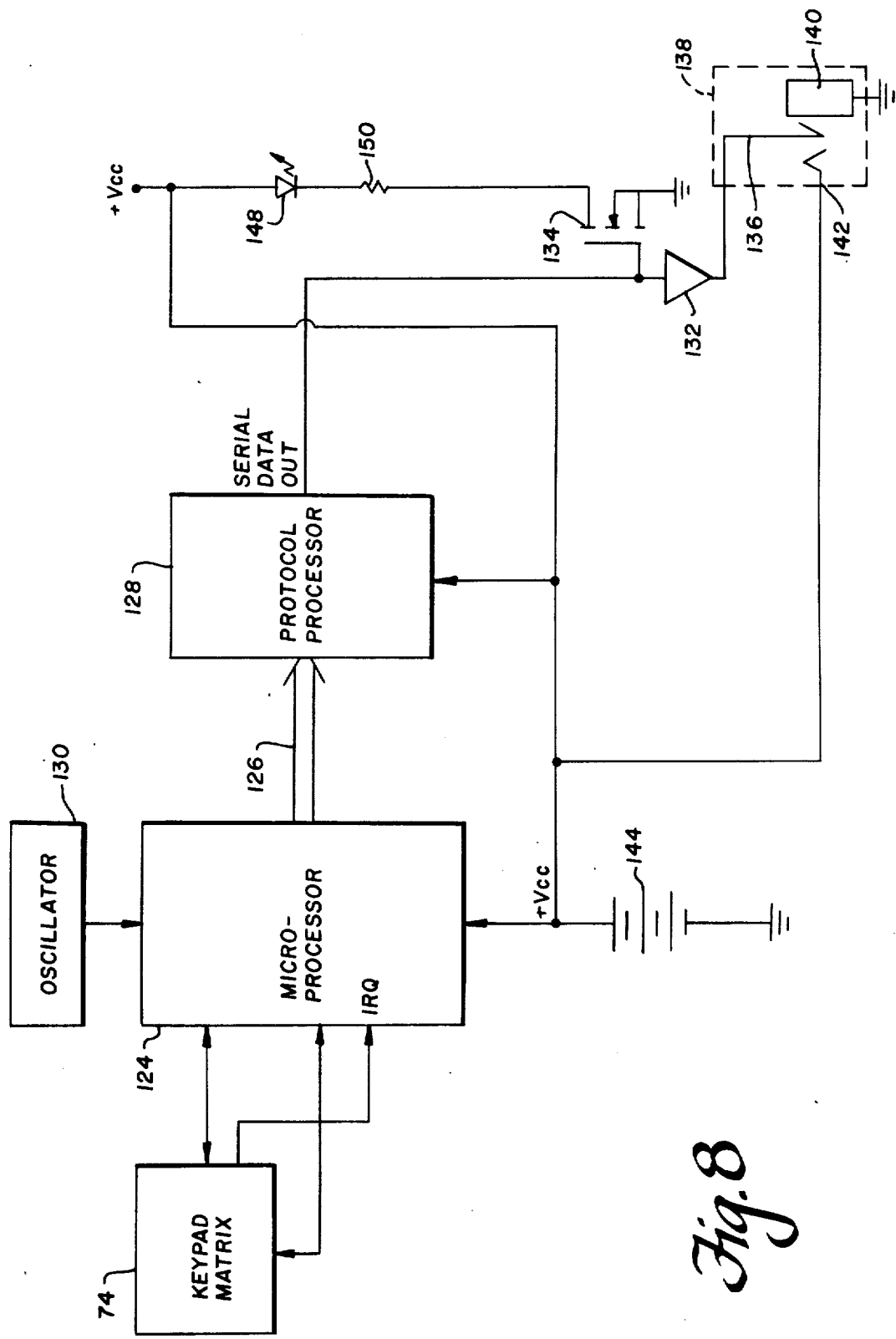
FIG. 8 is a block diagram of the keypads shown in FIGS. 4, 5 and 6.

FIG. 8 shows a block diagram of keyboards 20, 22 and 24. Each one of keyboards 20, 22 and 24 and mouse pointing device 18 may be operated in either a cordless mode or connected to computer 12 via a cord. The design and construction of each of keyboards 20, 22 and 24 is similar. A conventional keypad matrix 74 is connected to a conventional microprocessor 124. Microprocessor 124 (or some other digital logic device such as a conventional keyboard matrix scanner integrated circuit) scans keypad matrix 74 in a conventional manner to determine if a key of the keypad matrix had been depressed. If a key of keypad matrix 74 has been depressed, microprocessor 124 generates a code on data line 126 which is applied to a protocol processor 128. Microprocessor 124 is clocked at a rate determined by a conventional oscillator 130, which controls the rate at which the microprocessor scans the keypad matrix 24 and the rate at which data is transmitted to protocol processor 128. Protocol processor 128 (which may be a conventional protocol processor such as a DC-7A manufactured by SuperTex, Inc. or a standard UART part such as a MC6850 manufactured by Motorola Corporation) buffers the data appearing on data line 126, converts the data from parallel format to serial format, and insures that the data is in appropriate protocol format.

The serial data output generated by protocol processor 128 is applied to both a buffer 132 and to the gate of an FET 134.

The output of buffer 132 is applied to a pin 136 of a conventional connector 138. Connector 138 may be any suitable type of connector, such as an ¼ inch "stereotype" phone jack. Connector 138 is used to link the keyboard to computer 12 via a cord or cable 139. Data is transmitted from the keyboard to the computer 12 through one conductor of cord 139, while power used for powering the components of the keyboard is transmitted from computer 12 to the keyboard via another conductor of the cord. Power and data may share a common ground 140. A pin 142 of connector 138 connects the power supplied via cord 139 to microprocessor 124 and protocol processor 128. Pin 142 is also connected to the positive terminal of a battery 144 which is used to provide power to the keyboard components when the cord 139 is not connected to connector 138.

When a cord is not connected to connector 138, data is transmitted from the keyboard to computer 12 in the preferred embodiment by light-emitting diode (LED) 148. In the preferred embodiment, three LEDs 148 are connected in series between the positive terminal of battery 144 and the source of FET 134 through a series resistor 150. The serial data out produced by protocol processor 128 causes FET 134 to conduct, thereby activating LEDs 148. LEDs 148 may produce infrared radiation. LEDs 148 may be disposed behind a lens 152 such as that shown in FIGS. 5 and 6. LEDs 148 transmit the data produced by protocol processor 128 through free space to computer 12.

Figure 9:
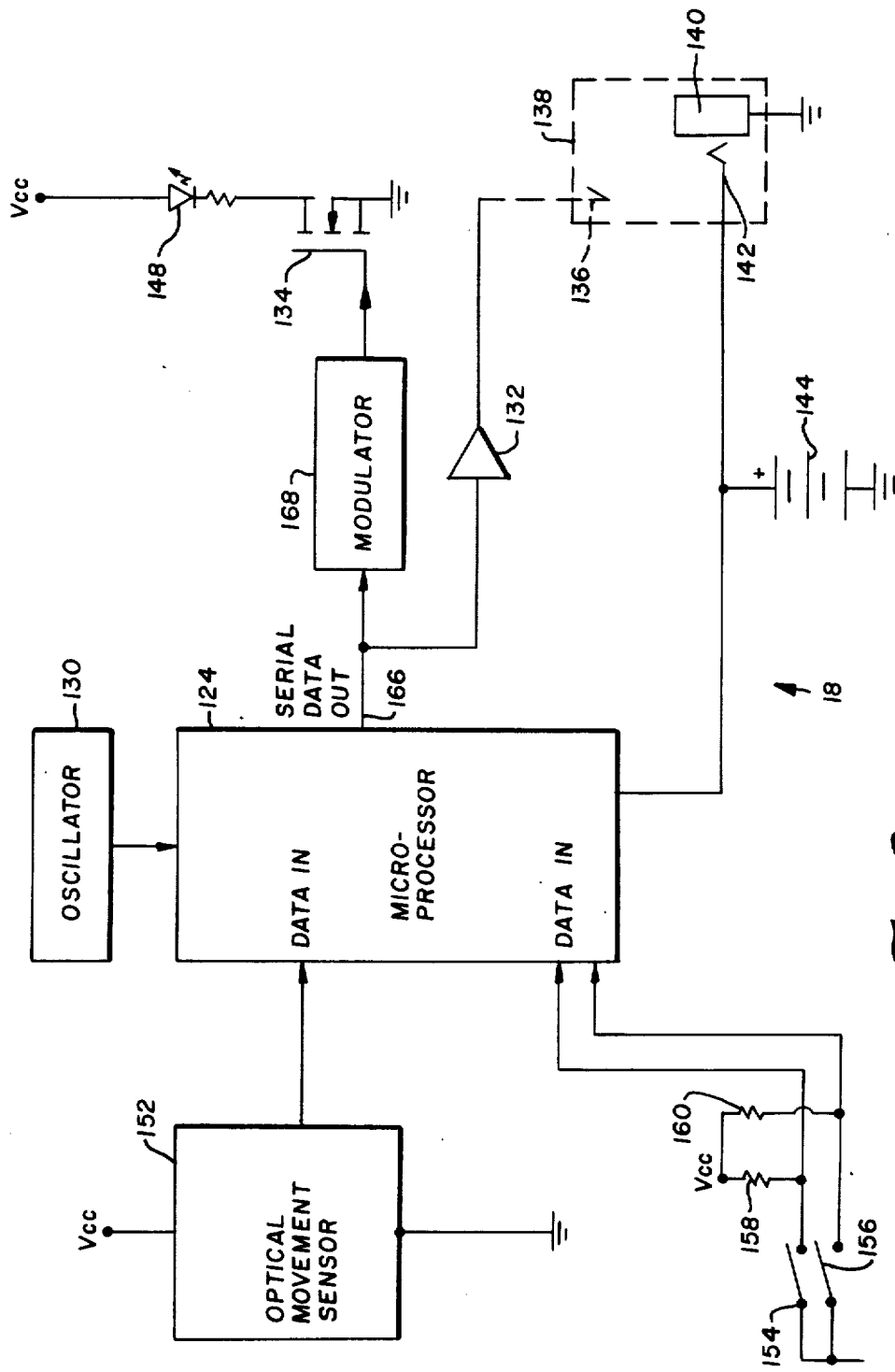
FIG. 9 is a block diagram of the mouse pointing device shown in FIG. 3.

FIG. 9 is a block diagram of mouse pointing device 18 in accordance with the present invention. Many of the components of mouse pointing device 18 are similar in function and structure to the components previously described in connection with FIG. 8 and that discussion will not be repeated again here. Of course, the keyboard shown in FIG. 8 transmits information in response to keyboard matrix 74 depressed by a user, while mouse pointing device 18 transmits information in response to movement of the mouse pointing device across a flat surface. A conventional optical movement sensor 152 detects the direction and amount of movement of the mouse pointing device across the surface and provides information indicative of the movement to microprocessor 124. Microprocessor 124 is also provided with data from lines connected to each of switches 154 and 156 (which are pulled up by pull-up resistors 158 and 160, respectively). Thus, microprocessor 124 is responsive to both information indicative of movement of the mouse pointing device 18 across the surface and the depression of switches 154 and 156.

Microprocesor 124 is conventional in design, and includes internal software and hardware to keep track of the position last output by optical movement sensor 152. Microprocessor 124 determines which one (if any) of switches 154 and 156 has been depressed and debounces the switch depression signal applied to the data input of the microprocessor in a conventional fashion. Microprocessor 124 provides a serial data output 166 having a protocol which is similar in format to that produced by protocol processor 128 described in connection with FIG. 8. Of course, the length of the string of serial output produced by microprocessor 124 depends upon the amount of information to be conveyed. The length of the string reflecting the position of mouse pointing device 18 is longer than the length of the string produced for keyboards 20-24 because of the greater degree of resolution needed to properly encode the positional information.

The serial data output is connected to the input of a conventional modulator 168 which modulates the serial data output onto a carrier in a conventional fashion and provides the modulated output to the gate of FET 134. Modulator 168 may simply be a gating array which applies a signal of a predetermined frequency to the gate of FET 134 when a signal is present on microprocessor serial data output 166. Modulator 168 is used to permit computer 12 to discriminate between the output provided by keyboards 20-24 and the output provided by mouse pointing device 18 during cordless operation of the mouse and the keyboards. Of course, other means of discriminating between channels (e.g., different serial data transmission rates, different serial data packet lengths or protocols, etc.) could be used in lieu of or in addition to modulator 168.)

FIG. 10 shows a block diagram of computer 12 in accordance with the present invention. Connectors 170, 172 and 174 are used interchangeably to connect the cords leading from alphanumeric keyboard 20, numeric keyboard 22 and function keyboard 24 to computer 12. A connector 176 dedicated to the mouse pointing device 18 is used to connect a cord from mouse pointing device 18 to computer 12. When a jack (not shown) is plugged into any one of connectors 170, 172 and 174, a sense lead 178 (which is connected to the "e" terminal of each of the connectors) is grounded via a terminal "f" of the connector. The sense leads 178 of each of connectors 170, 172 and 174 are connected together at a node 180, which in turn is connected to an input of a processor 182. Similarly, a sense lead 182 connected to connector 176 (the "e" pin of connector 176) is grounded to the "f" terminal of the connector whenever a jack is plugged into mouse connector 176. Sense lead 182 is also applied to an input of processor 182. The levels present on sense leads 180 and 182 inform processor 184 whether operation with a cord or remote control (cordless) operation is being used for the keyboards and for the mouse.

For cordless operation, the infrared information transmitted by LEDs 148 is received by an infrared receiver 186 of conventional design. Receiver 186 may include infrared sensors (not shown) disposed behind one or more lenses 187 on housing 16. Infrared receiver 186 applies an output to a demodulator 188 of conventional design which may include frequency-selective components such as filters to distinguish between information transmitted by mouse pointing device 18 and information transmitted by keyboards 20, 22 and 24. Demodulator 188 produces two outputs: a keyboard information output (on line 190) and a mouse information output (on line 192). Whenever sense lead 180 is at logic level one (thereby indicating that no cords are plugged into connectors 170, 172 or 174), the keyboard output line 192 of demodulator 188 is selected by a multiplexer (MUX) 194 or otherwise enabled as a data input to processor 184. The lines coming from a pin c of each of connectors 170, 172 and 174 (to which data is routed if a cord is connected to the connector) are ORed together by an OR gate 198. The output of OR gate 198 is therefore the combined data received from all of keyboards 20, 22 and 24.

The output of OR gate 198 is applied to an input of processor 184, which decodes the data in a conventional manner. In the preferred embodiment, each datum output by any one of the three keyboards 20, 22 and 24 is encoded into a unique code by the keyboard which originated it so that processor 184 does not need to keep track of from which keyboard the information was derived Table I below shows the way in which data passed by all three keyboards 20-24 are mapped into a common symbol table (TABLE I) as follows:

TABLE I

| MSB | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | | LSB | | | | | | | | | |
| 00 | | SOH | STX | ETX | EOT | ENQ | ACK | BEL | BS | HT | LF | VT | FF | CR | SO | SI |
| 10 | DLE | DC1 | DC2 | DC3 | DC4 | NAK | SYN | ETB | CAN | EM | SUB | ESC | IFS | GS | RS | US |
| 20 | space | ! | " | # | $ | % | & | . | ( | ) | * | + | , | − | . | / |
| 30 | 0 | 1 | 2 | 3 | 4 | 5 | 6 | 7 | 8 | 9 | : | ; | < | = | > | ? |
| 40 | @ | A | B | C | D | E | F | G | H | I | J | K | L | M | N | O |
| 50 | P | Q | R | S | T | U | V | W | X | Y | Z | [ | | ] | ∧ | − |
| 60 | . | a | b | c | d | e | f | g | h | i | j | k | l | m | n | o |
| 70 | p | q | r | s | t | u | v | w | x | y | z | { | | } | ~ | DEL |
| 80 | NUL | stop | enter | para | enter | para | space | stop | enter | para | → | ← | →\| | \|← | KF11 | KF12 |
| 90 | PF22 | PF19 | PF20 | PF21 | PF16 | PF17 | PF18 | PF13 | PF14 | PF15 | | ← | →\| | \| | PF23 | PF24 |
| A0 | KF10 | KF7 | KF8 | KF9 | KF4 | KF5 | KF6 | KF1 | KF2 | KF3 | → | ← | →\| | \|← | KF23 | KF24 |
| B0 | PF10 | PF7 | PF8 | PF9 | PF4 | PF5 | PF6 | PF1 | PF2 | PF3 | , | ← | →\| | . | PF11 | PF12 |
| C0 | KF22 | KF19 | KF20 | KF21 | KF16 | KF17 | KF18 | KF13 | KF14 | KF15 | → | ← | →\| | \|← | [ | ] |

TABLE I-continued

| | | | | | | | | LSB | | | | | | | | |
|---|---|---|---|---|---|---|---|---|---|---|---|---|---|---|---|---|
| MSB | 0 | 1 | 2 | 3 | 4 | 5 | 6 | 7 | 8 | 9 | A | B | C | D | E | F |
| DO | | open | move | delete | copy | options | space | stop | enter | para | → | ← | →\| | \|← | ' | ' |
| EO | / | A | B | C | D | E | F | G | H | I | J | K | L | M | N | O |
| FO | P | Q | R | S | T | U | V | W | X | Y | Z | ; | | | | |

Each of keyboards 20, 22 and 24 encodes its outputs directly into an ASCII representation (if there is one) to minimize decoding later on.

The mouse data output line 192 of demodulator 188 is selected by the line connected to data pin c of mouse connector 176 using a MUX 196. The input of processor 184 deserializes the data and decodes the selected data in a conventional manner to determine the direction and amount of movement of mouse pointing device 18 and the identity of any button on the mouse pointing device which was depressed.

Processor 184 may mainly comprise a conventional central processing unit and a random access memory which stores data and programs. Processor 184 produces a display on display device 14, controls the position of a cursor displayed on the display device in response to movement of mouse pointing device 18, displays characters on display device 14 in response to the depression of buttons on keyboards 20, 22 and 24, and performs other tasks in response to input information produced by any one of keyboards 20-24 and mouse pointing device 18 as controlled by internal software programming conventional in design. Processor 184 may be any conventional processor such as a 68000 microprocessor or a commonly-available, conventional computer device such as an IBM PC, an Apple IIe, etc.

Although the exemplary embodiment has been described in detail above, those skilled in the art will appreciate that many variations and modifications may be made without departing from the novel and advantageous features of the invention. For instance, transmission of data between the various input peripheral devices and the computer 12 could be accomplished in a variety of different ways (such as by rf transmission, ultrasonic transmission, etc.). Likewise, although the preferred embodiment utilizes only four input peripheral devices, any number of such devices could be used. Although the presently preferred embodiment utilizes a mouse pointing device and three keyboards, other input devices (such as a conventional light pen graphics tablet or a trackball) might be used in lieu one or more of the keyboards. Moreover, the present invention is by no means limited to the particular components described above, but rather, could be implemented in a variety of other different ways using other digital logic devices or conventional components. For instance, microprocessor 124 shown in FIG. 8 could be replaced by an SSI keyboard matrix decoder conventional in design. Processor 184 could be individually provided with sense leads 178 of each of connectors 170, 172 and 174, and could permit each of keyboards 20-24 to be independently operated using either cordless data transmission or using data transmitted via a cord. Accordingly, all such variations and modifications are intended to be included in the scope of the claims.

What is claimed is:

1. An apparatus for processing information comprising:
   first keyboard means manipulated by a user for selectively producing a first input data;
   second keyboard means manipulated by a user for selectively producing second input data;
   third keyboard means manipulated by a user for selectively producing third input data;
   electronic mouse means manipulated by a user for selectively producing fourth input data;
   data processing means, responsive to said first, second, third and fourth input data simultaneously, for processing said input data; and
   a housing having means defining a plurality of indentations and means defining a cavity;
   said first keyboard means being selectively disposed in said cavity and said second and third keyboard means and said electronic mouse means being selectively disposed in at least one of said plurality of indentations, said housing further including:
   means for selectively sealing said cavity when said first keyboard means is disposed in said cavity; and
   ejector means, coupled to said sealing means, for ejecting said first keyboard means from said cavity when said cavity is unsealed.

2. An apparatus as in claim 1 wherein said ejector means includes:
   an ejecting member rectilinearly slidable through said cavity between at least a first position and a second position, said ejecting member sliding to said first position when said first keyboard means is disposed in said cavity;
   biasing means for biasing said ejecting member towards said second position, said first keyboard means being ejected from said cavity as said ejecting member slides from said first position to said second position;
   latching means for selectively retaining said first keyboard means in a predetermined position within said cavity; and
   actuating means for causing said latching means to release said first keyboard means in response to the unsealing of said cavity by said sealing means.

3. An apparatus as in claim 2 wherein:
   said first keyboard means includes means for defining a cavity therein; and
   said latching means includes engaging means for selectively engaging with said cavity of said first keyboard means.

4. An apparatus as in claim 1 further including:
   means for producing an electrical signal; and
   means, disposed on said ejector means, for coupling said electrical signal to said first keyboard means.

* * * * *